TELEVISION SIGNAL TRANSMISSION SYSTEM

Filed April 19, 1954 2 Sheets-Sheet 1

INVENTORS
KEES TEER
JOSUE JEAN PHILIPPE VALETON

BY Fred M Vogel
AGENT

Nov. 10, 1959 K. TEER ET AL 2,912,491

TELEVISION SIGNAL TRANSMISSION SYSTEM

Filed April 19, 1954 2 Sheets-Sheet 2

INVENTORS
KEES TEER
JOSUE JEAN PHILIPPE VALETON

BY Fred M Vogel
AGENT

United States Patent Office 2,912,491

Patented Nov. 10, 1959

2,912,491

TELEVISION SIGNAL TRANSMISSION SYSTEM

Kees Teer and Josué Jean Philippe Valeton, Eindhoven, Netherlands, assignors, by mesne assignments, to North American Philips Company, Inc., New York, N.Y., a corporation of Delaware Application April 19, 1954, Serial No. 424,207

Claims priority, application Netherlands May 13, 1953

4 Claims. (Cl. 178—6)

The invention relates to a transmission system for signals of television images or similar images scanned line-wise, in which system moreover two auxiliary carrier waves, each of which modulated by signals also relating to television images are transmitted within the frequency range occupied by the first-mentioned signals.

Such systems, which may be employed for three-colour television, have the advantage that at the receiver end the separation of the three kinds of signals requires neither a switch changing over with line-, field- or frame-frequency nor synchronized separating signals of the desired waveform, frequency and phase.

However such systems give rise to difficulties in that at the receiver end the auxiliary carrier waves with the signals modulated thereon interfere with the image of the first-mentioned signals. If there is only one auxiliary carrier wave in the frequency range occupied by the first-mentioned signals and if the image of these signals is composed of an odd number of lines with the aid of two interlaced fields, the interference of the auxiliary carrier wave in this image is found to be substantially not troublesome to the eye, if the frequency of this auxiliary carrier wave is chosen to be equal to an odd-numbered multiple of half the line frequency. This phenomenon is based on the fact that by the choice of the frequency of the auxiliary carrier wave interferences on a given line are suppressed for the major part during the next-following scanning of this line, since the phase difference of the auxiliary carrier wave at two instants differing by one image period is $\pi$ radians and the phase difference at two corresponding points of two successive even-numbered or odd-numbered lines within one image period is also $\pi$ radians. Strictly speaking this is only true if the signals modulated on this auxiliary carrier wave do not vary from image to image. However, it is known that, if this variation is not excessively large, this will quite approximately also apply to signals not having the same waveform in each image period.

It should be noted that in the case of the said image composition the said phase relationship also occurs if for example the frequency of the auxiliary carrier wave is equal to a multiple of the line frequency and if at the beginning of each line period the phase of the auxiliary carrier wave is shifted by $\pi$ radians. It is not the frequency that is important, but the phase relationship. Consequently, if provisions are made to have this phase relationship prevail also when the image is not composed in the said manner the desired effect is also obtained, i.e. the interference of the auxiliary carrier wave with the image of the first-mentioned signals is minimized.

In many cases, for example with three-colour television, in which the signals relating to the three kinds of information are transmitted simultaneously, two auxiliary carrier waves are required. It seems desirable to choose the frequencies of the two auxiliary carrier waves, as is stated above, equal to an odd-numbered multiple of half the line frequency, the multiple being different, as a matter of fact, for each carrier wave. It is found, however, that an interference is produced in the image of the first-mentioned signals, the frequency of this interference being equal to the difference between the frequencies of the two auxiliary carrier waves, i.e. to a multiple of the line frequency. The interferences on a given line are then amplified during the subsequent scanning of this line, which is the more troublesome the lower the said difference frequency.

It has therefore been suggested to choose the frequencies of the two auxiliary carrier waves equal to a definite, individually different multiple of other fractions of the line frequency than the half line frequency, the said difference frequency being thus not equal to a multiple of the line frequency. This provides, indeed, a material improvement, but these solutions are not entirely satisfying, not in the first place in the observation of the images of colour-television receivers but particularly in the observation of the images of black and white receivers. This is due to the fact that the interference is suppressed to the eye not in two image periods, but in three or more.

The transmission system according to the invention mitigates this disadvantage and has the feature that for the auxiliary carrier wave of lower frequency the phase difference at two instants spaced apart by one image period is $\pi$ radians and the phase difference at two corresponding points of two successive even-numbered or successive odd-numbered lines of one image period is $\pi$ radians and that for the auxiliary carrier wave of higher frequency the phases at two instants spaced apart by one image period are equal and the phase difference at two corresponding points of two locally successive lines of one image period is $\pi$ radians.

If an image is composed of an odd number of lines with the aid of two interlaced fields, this may be achieved by choosing the frequency of the auxiliary carrier wave of lower frequency to be equal to an odd-numbered multiple of half the line frequency and the frequency of the auxiliary carrier wave of higher frequency equal to a multiple of the line frequency, which is the same as being equal to an even-numbered multiple of half the line frequency, the phase of the latter auxiliary carrier wave being, however, shifted by $\pi$ radians at the beginning of each half image period.

The invention is based on the experimental statement that, if only the frequency of the auxiliary carrier wave of higher frequency is sufficiently high, the interference on a given line, although it is not suppressed during the subsequent scanning of this line is compensated to a sufficient extent by the interference on a locally subsequent line, the polarity of which interference being reversed owing to the said phase shift, to provide, in conjunction with the interference pattern of the auxiliary carrier wave of lower frequency and the interference pattern of the said difference frequency a materially more satisfying result with black and white receivers than with the aforesaid systems in which use is made of two auxiliary carrier waves. It will be obvious that at the said choice of the auxiliary carrier wave frequencies and the associated phase relationship the interference pattern of the said difference frequency is identical with the interference pattern of the auxiliary carrier wave of lower frequency. If the image is again composed of an odd number of lines with the aid of two interlaced fields and if the frequency of the auxiliary carrier wave of the higher frequency is a multiple of the line frequency and the frequency of the auxiliary carrier wave of the lower frequency is an odd-numbered multiple of half the line frequency, the resultant difference frequency will also be an odd-numbered multiple of half the line frequency. The phase shift of the auxiliary carrier wave of the higher frequency does not affect, of course, the interference pattern of the difference frequency.

It is known that, if use is made of an auxiliary carrier wave for which the phase difference at two instants spaced apart by one image period is $\pi$ radians and the phase difference at two corresponding points of two successive even-numbered or successive odd-numbered lines within one image period is also $\pi$ radians, certain shift effects may be materially reduced by providing that the phase difference at two corresponding points of two locally successive lines within one image period is $\pi/2$ radians. If the image is composed of an odd number of lines with the aid of two interlaced fields, this phase relationship is obtained by shifting the phase of the auxiliary carrier wave by $\pi/2$ radians at the beginning of one half image period and by shifting the phase by $$-\frac{\pi}{2}$$

radians during the subsequent half image period, i.e. by alternating shifts of $$\frac{\pi}{2} \text{ and} -\frac{\pi}{2}$$

This measure may be carried out with the system according to the invention also with the auxiliary carrier wave of the lower frequency. This has the advantage that the difference frequency also corresponds to this phase relationship.

The system according to the invention, and the transmitter and the receiver for use in this system will be described more fully with reference to the embodiments shown in the drawing, in which Fig. 1 shows the frequency spectrum of three television signals in the transmission path in accordance with the invention;

Figures 1, 2:
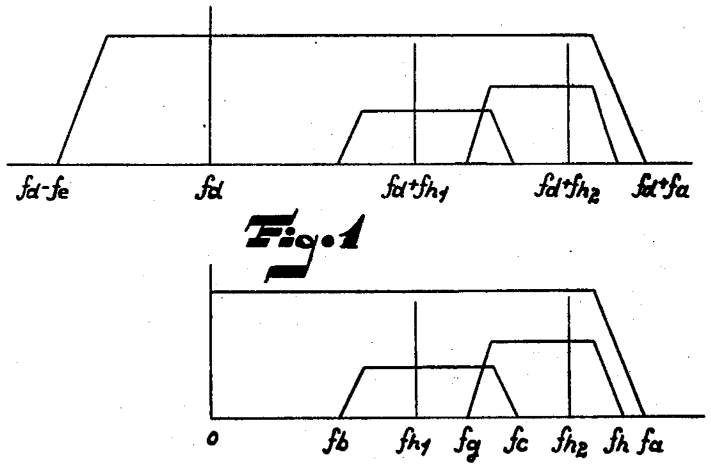
Fig. 2 shows the frequency spectrum of these three television signals at the transmitter end.

Fig. 1 shows the frequency spectrum which may be used in the system according to the invention, for example if the three kinds of signals relate each to a television image, for example in the case of three-colour television and transmitted by radio, this spectrum extending between a frequency $f_d-f_e$ and a frequency $f_d+f_a$. Such a frequency spectrum is obtained by the modulation of a carrier wave having a frequency $f_d$ by three signals, the first of which extends through a frequency range of 0 to $f_a$, the second from $f_b$ to $f_c$ and the third from $f_g$ to $f_h$, as indicated in Fig. 2 and by partial suppression of the lower side band. The signal having a large bandwidth, for example the brightness signal, thus extends to the frequency $f_a$; the second signal lies between the frequencies $f_b$ and $f_c$ and is produced by modulating an auxiliary carrier wave, the phase difference of which at two instants spaced apart by one image period is $\pi$ radians and the phase difference of which at two corresponding points of two successive even-numbered or successive odd-numbered lines within one image period is also $\pi$ radians, by means of one of the colour signals; the third signal lying between the frequencies $f_g$ and $f_h$ is obtained by modulating an auxiliary carrier wave, the phases of which at two instants spaced apart by one image period are equal and the phase difference of which at two corresponding points of two locally successive lines within one image period is $\pi$ radians by means of the other colour signal.

Such a frequency spectrum is, of course, also obtained by modulating a carrier wave having a frequency $f_d$ by the signal having a large bandwidth and by using a colour signal for modulating each of two carrier waves having frequencies $f_d+f_{h1}$ and $f_d+f_{h2}$. Subsequent to demodulation in the receiver, however, the carrier waves $f_d+f_{h1}$ and $f_d+f_{h2}$ appear nevertheless as auxiliary carrier waves having frequencies $f_{h1}$ and $f_{h2}$ in the video frequency spectrum of the signal having a large bandwidth.

Figure 3:
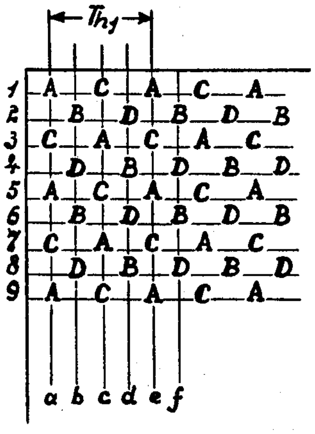
Figs. 3, 4 and 5 show interference patterns occurring in the system according to the invention.

Fig. 3 shows diagrammatically the interference pattern of the auxiliary carrier wave having the lower frequency in the image of the signal having the largest bandwidth for the case in which this image is composed with the aid of two fields. The lines 1, 2, 3 and so on indicate the lines composing the image; the lines *a*, *b*, *c* and so on connect corresponding points of the various lines of the image. The points A indicate the areas of the maxima of the auxiliary carrier wave during the first field period of the first image period. The points B indicate the areas of the maxima during the second field period of the first image period, the points C and D the areas of the maxima during the first and the second field period respectively of the second image period. The maxima of the third and fourth image period coincide with the maxima of the first and seond image period respectively. The distance $T_{h1}$ indicates the period of the auxiliary carrier wave $f_{h1}$ in the image. As is evident from the figure, the phase difference of the auxiliary carrier wave at two corresponding points of two locally successive lines of one image period $\pi/2$ radians, since as is evident from a comparison with $T_{h1}$, the distance between the lines *a* and *b* corresponds to one quarter of the period $T_{h1}$.

Figure 4:
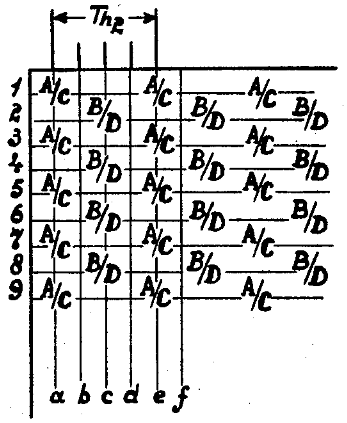

Fig. 4 shows the interference pattern of the auxiliary carrier wave having the higher frequency in the image of the signal having the larger bandwidth. The references correspond to those of Fig. 3. The distance $T_{h2}$ designates the period of the auxiliary carrier wave $f_{h2}$ in the image $T_{h2}$ is, of course, smaller than $T_{h1}$.

Figure 5:
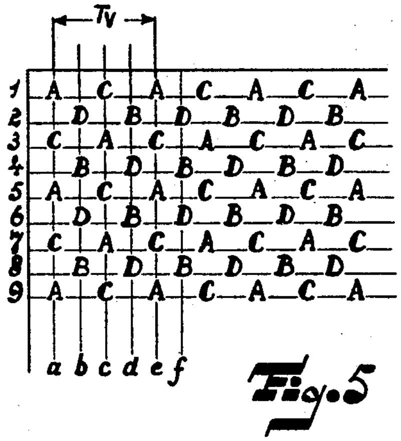

Fig. 5 shows the interference pattern of the difference frequency in the image of the signal having the larger bandwidth, for the case in which the interference patterns of the two auxiliary carrier waves are those of Figs. 3 and 4. $T_v$ designates the period of the difference frequency in the image. $T_v$ need not be equal to $T_{h1}$. It is evident that this pattern is identical with that of the auxiliary carrier wave $f_{h1}$. Only points B and D are interchanged.

If the image is composed of only one field, A must be taken for B and C for D in the figures. The points A then indicate the areas of the maxima during the first, third, etc. image periods and the points C the areas of the maxima during the second, fourth, etc. image periods.

The signal indicated in Fig. 2 is obtained in the receiver. This signal may be supplied as a whole to the control-electrode of a reproducing tube and, moreover, to two selective demodulating devices, of which one is tuned to the frequency $f_{h1}$ and the other to the frequency $f_{h2}$. The output signals of these demodulating devices may be supplied each to one control-electrode of two reproducing tubes. Each of the reproducing tubes has supplied to it interferences produced by the two other signals and, moreover, the signals desired for the reproducing tube concerned; moveover the interference of the said difference frequency is supplied to the reproducing tube for the signal having the large bandwith. Owing to the phase relationship according to the invention the effect of these interferences are found to be extremely small.

Figures 6, 7:
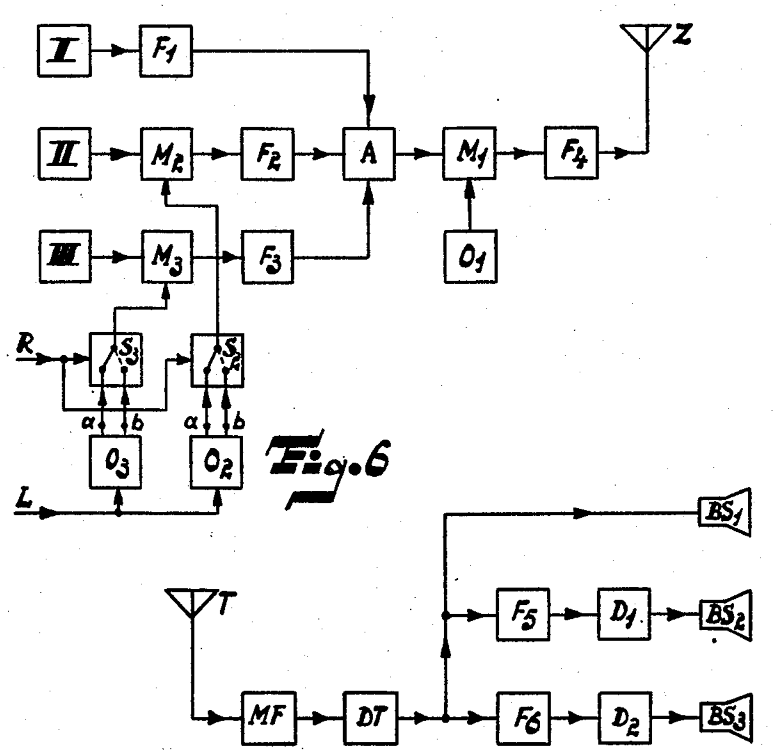
Fig. 6 shows diagrammatically one embodiment of a transmitter for use in a system according to the invention and Fig. 7 shows diagrammatically one embodiment of a receiver for use in a system according to the invention.

Fig. 6 shows a simplified embodiment of a transmitter for use in the transmission system according to the invention in a block diagram. It is assumed that the image is composed of an odd number of lines with the aid of two interlaced fields.

The devices I, II and II comprise each a pick-up camera, producing the signal having the large bandwith and the two colour signals respectively. The signal from I is supplied to a low-pass filter $F_1$ having a cut-off frequency $f_a$. The output signal from II is supplied to a modulator $M_2$, in which the signal is modulated on an auxiliary carrier wave having a frequency $f_{h1}$, equal to an odd-numbered multiple of half the line frequency. This auxiliary carrier wave is taken from a device $O_2$, comprising a suitable oscillator and controlled by the line-synchronizing pulses coming in at L. This oscillator is constructed in a manner such that the output voltage of the device $O_2$ at point $a$ differs by $\pi/2$ radians in phase from the output voltage at point $b$. The switch $S_2$ connects the modulator $M_2$ alternately to $a$ and $b$. This alternation takes place after each field. The switch $S_2$ is controlled, for this purpose, by the field synchronizing pulses coming in at R. The output signal of the modulator $M_2$ is supplied to a filter having a pass range between the frequencies $f_b$ and $f_c$.

The output signal from III is supplied to a modulator $M_3$, in which the signal is modulated on an auxiliary carrier wave having a frequency $f_{h2}$, equal to a multiple of the line frequency. This auxiliary carrier wave is taken from a device $O_3$, comprising a suitable oscillator and controlled also by the line synchronizing pulses coming in at L. This oscillator is a push-pull oscillator and the output voltage of $O_3$ at point $a$ is in phase opposition to the output voltage of $O_3$ at point $b$. The switch $S_3$ connects $M_3$ alternately to the points $a$ and $b$ of $O_3$. This alternation also takes place after each field and the switch $S_3$ is controlled also by the field synchronizing pulses coming in at R. The output signal of $M_3$ is supplied to a filter $F_3$ having a pass range between the frequencies $f_g$ and $f_h$. The output signals of the filters $F_1$, $F_2$ and $F_3$ are combined in the adding device A. The output signal of A may be transmitted through a line or supplied to a transmitter aerial Z (Fig. 6) subsequent to modulation on a high-frequency carrier wave having a frequency $f_d$, derived from a device $O_1$, comprising a suitable oscillator and subsequent to bandwidth restriction in a filter $F_4$ having a pass range between the frequencies $f_d - f_e$ and $f_d + f_a$.

Fig. 7 shows a simplified embodiment of a receiver for the reception of signals transmitted by the transmitter shown in Fig. 6 in a block diagram. The signal received through an aerial T is supplied through an intermediate-frequency stage MF to a demodulator stage DT, at the output terminals of which prevails a signal as is shown in Fig. 2. This output signal is supplied on the one hand to a reproducing tube $BS_1$ and on the other hand to two filters $F_5$ and $F_6$. The filter $F_5$ has a pass range between the frequencies $f_b$ and $f_c$ and the filter $F_6$ has a pass range between the frequencies $f_g$ and $f_h$. The output signals of $F_5$ and $F_6$ are supplied to the demodulators $D_1$ and $D_2$ respectively. The combination $F_5$—$D_1$ constitutes a demodulating circuit tuned to the auxiliary carrier wave $f_{h1}$ and supplies the signal modulated on this carrier wave plus interference from the two other signals, which interference, however, is substantially neutralized to the eye in the reproducing tube $BS_2$ by the said choice of the auxiliary carrier wave frequencies. Also the combination of $F_6$—$D_2$ constitutes a demodulating circuit tuned to the auxiliary carrier wave $f_{h2}$ and produces to the reproducing tube $BS_3$, the signal modulated on this auxiliary carrier wave plus the interference from the two other signals. The images of the three reproducing tubes may finally be joined by optical means. A further possibility lies, for example, in that the output signals of DT, $D_1$ and $D_2$ are supplied to the control-electrodes of a three-colour tube.

The signal emitted by the transmitter shown in Fig. 6 will produce in the reproducing tube $BS_1$, the same image in a conventional black and white receiver as in the receiver used in the system according to the invention provided that of course, line frequency, image frequency and so on are the same for the transmitter and the receiver. The interference of the two auxiliary carrier waves in this image will, however, be very little troublesome owing to the said measures.

The receiver described with reference to Fig. 7 is suitable for the reception of a signal emitted by a conventional black-white television transmitter. The output signal of the demodulating stage DT may be supplied, for example, to the three reproducing tubes or in the case of a three-colour tube to the three control-electrodes of the tube.

What is claimed is:

1. A transmission system for a plurality of signals relating to television images or the like formed of repetitive images scanned line-wise, said system comprising signal sources for providing said plurality of signals, means for producing a main carrier wave, means for modulating said main carrier wave in accordance with a first one of said signals, generator means for producing two auxiliary carrier waves having different frequencies within the frequency range of the modulated main carrier wave, the lower-frequency one of said auxiliary carrier waves having a frequency equal to an odd-numbered multiple of half the line repetition frequency of said images and the higher-frequency one of said auxiliary carrier waves having a frequency equal to an even-numbered multiple of half the line repetition frequency of said images, said generator means including means for shifting the phase of the lower-frequency auxiliary wave by the amount of $\pi$ radians between successive image scannings of a given point, means for shifting the phase of said lower-frequency auxiliary wave by the amount of $\pi$ radians between the scannings of corresponding points on alternate lines of an image period, means for causing the phase of the higher-frequency of one of said auxiliary waves to be the same for successive image scannings of a given point, and means for shifting the phase of said higher-frequency auxiliary wave by the amount of $\pi$ radians between the scannings of adjacent points on two successively scanned lines of one image period, and said system further comprising means for modulating said auxiliary carrier waves with second and third ones of said signals, respectively.

2. A transmission system as claimed in claim 1, in which said generator means includes means connected to cause the phase of said lower-frequency auxiliary carrier wave to be shifted by an amount of $$\frac{\pi}{2}$$

radians between the scannings of adjacent points on two successively scanned lines of one image period.

3. A transmission system as claimed in claim 1, including a receiver connected to receive said modulated carrier waves and comprising a first frequency-selective demodulator tuned to the frequency of one of said auxiliary carriers waves and a second frequency-selective demodulator tuned to the frequency of the other of said auxiliary carrier waves.

4. A transmission system for signals relating to television images or the like formed of repetitive images scanned line-wise, said system comprising first, second and third sources of said signals, a source for producing a first auxiliary carrier wave having a frequency equal to an odd-numbered multiple of half the line repetition frequency of said images, a first modulator connected to modulate said auxiliary carrier wave with one of said signals, means connected to shift the phase of said auxiliary carrier wave by the amount of $$\frac{\pi}{2}$$

radians after each field scanning of said images, a source for producing a second auxiliary carrier wave having a frequency equal to an even-numbered multiple of half the line repetition frequency of said images, a second modulator connected to modulate said second auxiliary carrier wave with another one of said signals, means connected to shift the phase of said second auxiliary carrier wave by the amount of $\pi$ radians after each field scanning of said images, an adding device connected to combine the modulated said auxiliary carrier waves and the remaining one of said signals, a source of a main carrier wave, and a modulator connected to modulate said main carrier wave with the combined output of said adding device.

References Cited in the file of this patent

UNITED STATES PATENTS

| | | |
|---|---|---|
| 2,635,140 | Dome | Apr. 14, 1943 |
| 2,677,721 | Bedford | May 4, 1954 |
| 2,678,348 | Ballard | May 11, 1954 |
| 2,810,780 | Loughlin | Oct. 22, 1957 |

FOREIGN PATENTS

| | | |
|---|---|---|
| 1,057,049 | France | Oct. 28, 1953 |

OTHER REFERENCES

Principles of NTSC Compatible Color Television Electronics, pp. 88–97 inclusive, February 1952.